US009447703B2

(12) United States Patent
Chalabi et al.

(10) Patent No.: US 9,447,703 B2
(45) Date of Patent: Sep. 20, 2016

(54) WASTE PROCESSING (71) Applicant: Chinook End-Stage Recycling Limited, Nottingham (GB)

(72) Inventors: Rifat Al Chalabi, Nottingham (GB); Ophneil Henry Perry, Nottingham (GB); Ke Li, Nottingham (GB)

(73) Assignee: Chinook End-Stage Recycling Limited, Nottingham (GB)

( * ) Notice: Subject to any disclaimer, the term of this patent is extended or adjusted under 35 U.S.C. 154(b) by 0 days.

(21) Appl. No.: 14/399,682

(22) PCT Filed: Apr. 30, 2013

(86) PCT No.: PCT/GB2013/051101
§ 371 (c)(1),
(2) Date: Nov. 7, 2014

(87) PCT Pub. No.: WO2013/167870
PCT Pub. Date: Nov. 14, 2013

(65) Prior Publication Data
US 2015/0089947 A1 Apr. 2, 2015

(30) Foreign Application Priority Data
May 8, 2012 (GB) .................................. 1208165.9

(51) Int. Cl.
F01K 13/00 (2006.01)
F01K 27/00 (2006.01)
F01K 23/06 (2006.01)
F23G 5/027 (2006.01)
F23G 5/04 (2006.01)
F23G 7/10 (2006.01)
F01K 11/00 (2006.01)
F02C 3/28 (2006.01)

(52) U.S. Cl.
CPC ............ *F01K 23/067* (2013.01); *F01K 11/00* (2013.01); *F02C 3/28* (2013.01); *F23G 5/027* (2013.01);
(Continued)

(58) Field of Classification Search
CPC ...... A45D 20/12; A45D 20/22; A45D 20/44; A47K 10/48; B01D 53/261; B31F 1/285; B44D 3/006; C01B 3/16; C01B 3/40; C01B 2203/0233; C01B 2203/0283; C01B 2203/0475; C01B 2203/1052; C01B 2203/1082; C01B 21/20; C01B 33/003; C01B 39/02; C01B 39/04; C01B 45/00; C01B 53/00; C01B 53/02; C01B 57/04; C01B 57/06; C10F 5/00; D06F 58/04; D06F 58/10; D06F 58/28; D06F 2058/2829; D06F 2058/2883; F01B 17/02; F01K 23/065; F01N 5/02; F02B 73/00; F02G 5/04; F23G 5/027; F23G 5/10; F23G 5/15; F23G 5/165; F23G 5/18; F23G 5/50; F23G 90/06; F23G 2206/203; F23G 2207/20; F23G 2207/30; F23J 1/00; F26B 5/08; F26B 7/00; F26B 9/003; F26B 9/006; F26B 9/06; F26B 17/04; F26B 21/04; F26B 21/083; F26B 25/066; F26B 2210/16; H01L 21/67028; H01L 21/67034; Y02E 10/72; Y02E 20/12; Y02E 20/14; Y02E 50/14
USPC ....... 37/58, 80, 90, 201, 218, 380, 381, 413, 37/499, 524; 60/618, 645, 698; 110/187, 110/191, 212, 229; 201/1, 8, 21, 39; 423/650–655
See application file for complete search history.

(56) References Cited

U.S. PATENT DOCUMENTS
5,553,554 A 9/1996 Urich, Jr.
5,922,090 A 7/1999 Fujimura et al.
(Continued)

FOREIGN PATENT DOCUMENTS
CN 1409045 4/2003
CN 1447888 10/2003
(Continued)

*Primary Examiner* — Kenneth Bomberg
*Assistant Examiner* — Daniel Wagnitz
(74) *Attorney, Agent, or Firm* — Wells St. John P.S.

(57) ABSTRACT

The present invention provides a method and apparatus of processing material having an organic content. The method comprises heating a batch of the material ("E") in a batch processing apparatus (16) having a reduced oxygen atmosphere to gasify at least some of the organic content to produce syngas, The temperature of the syngas is then elevated and maintained at the elevated temperature in a thermal treatment: apparatus (18) for a residence time sufficient to thermally break down any long chain hydrocarbons or volatile organic compounds therein. The calorific value of the syngas produced is monitored by sensors (26) and, when the calorific value of the syngas is below a predefined threshold, the syngas having a low calorific value is diverted to a burner of a boiler (22) to produce steam to drive a steam turbine (36) to produce electricity ("H"). When the calorific value: of the syngas exceeds the predefined threshold syngas having a high calorific value is diverted to a gas engine (40) to produce electricity (F").

31 Claims, 6 Drawing Sheets (52) U.S. Cl.
CPC . *F23G 5/04* (2013.01); *F23G 7/10* (2013.01); *F23G 2201/10* (2013.01); *F23G 2201/40* (2013.01); *F23G 2206/202* (2013.01); *F23G 2206/203* (2013.01); *F23G 2207/104* (2013.01); *F23G 2207/108* (2013.01); *F23G 2209/26* (2013.01); *F23G 2900/50204* (2013.01); *Y02E 20/12* (2013.01)

(56) References Cited

U.S. PATENT DOCUMENTS

| | | |
|---|---|---|
| 6,190,429 B1 | 2/2001 | Fujimura et al. |
| 6,807,915 B2 | 10/2004 | Sugano et al. |
| 6,857,379 B2 | 2/2005 | Gross et al. |
| 2001/0011438 A1 | 8/2001 | Fujimura et al. |
| 2003/0051647 A1 | 3/2003 | Sugano et al. |
| 2004/0103832 A1 | 6/2004 | Gross et al. |
| 2011/0283710 A1 | 11/2011 | Brunhuber et al. |

FOREIGN PATENT DOCUMENTS

| | | |
|---|---|---|
| CN | 201380036268.4 | 12/2015 |
| GB | 2470127 | 11/2010 |
| GB | 1208165.9 | 6/2012 |
| JP | H10-238727 | 9/1998 |
| JP | 2006-21838 | 8/2006 |
| WO | WO 2008/122875 | 10/2008 |
| WO | WO 2011/128918 | 10/2011 |
| WO | PCT/GB2013/051101 | 7/2013 |

WASTE PROCESSING

CROSS REFERENCE TO RELATED APPLICATION

This application is a 35 U.S.C. §371 of and claims priority to PCT International Application No. PCT/GB2013/051101 which was filed on 30 Apr. 2013, and was published in English, and claims priority to GB Patent Application No. 1208165.9, which was filed on 8 May 2012, the teachings of which are incorporated herein by reference.

The present invention relates to systems for processing material containing organic content, in particular it relates to waste to energy systems for extracting energy from waste containing organic content which has a low calorific value.

Organic low calorific value (CV) waste, such as high moisture content municipal solid waste (MSW), food waste, agricultural wastes and high moisture sludge are difficult to process.

In some countries, for example in northern countries where there is high rain and snowfall waste typically has a higher moisture content that decreases its calorific value (per mass unit). Furthermore, as more plastics are recycled, and are therefore removed from the waste stream, the residual waste having a lower plastics content has a reduced CV.

One method of processing waste is by incineration. Typically prior to incineration it is necessary to have to mix with such waste additional fuel, i.e. from another source, for example coal, dry biomass, natural gas etc, such that during incineration self sustained combustion can be maintained, i.e. an auto thematic processing is achieved.

Some waste is processed by a gasification process in which the waste is heated in a low oxygen atmosphere to produce synthetic gas, and the gas is burned to produce a high temperature exhaust gas which is used to produce electrical energy, e.g. by heating water to drive a steam turbine.

Conventional gasifiers include continuous process fluidized bed gasifiers, continuous or batch fixed bed type, or grate type gasifiers. However, these types of gasifiers are not well suited to processing low calorific waste. The majority of commercial gasifiers are continuously operated, i.e. the waste is fed in one end, passes continuously throughout the apparatus and exits at the other end, and the gas is taken off. As the material passes through the gasifier it is first dried as the heat drives off the moisture content and then the material is gasified during which the energy within the waste is released in the form of hydrocarbon molecules along with inert gasses such as nitrogen. The moisture and gasses are released in the same processing chamber and are drawn off together. The speed of the gas flow through the processing chamber is very high, in the region of 3 $ms^{-1}$ resulting in a thoroughly mixed output gas. The gas which results from such a process will have a high moisture content and low synthesis gas ($CO$, $H_2$, $CH_4$) content. The calorific value of the gas output will also therefore be low. Furthermore, due to the large moisture content of the waste being continually loaded into the apparatus it is usually necessary to use an external fuel source, e.g. natural gas or coal, to produce the heat necessary to evaporate the water. This results in a larger production of $CO_2$ which is not only environmentally unsound but which also dilutes the syngas produced even more.

The end result is that the syngas produced is of a low quality which, without extensive and energy intensive post processing, is only suitable for combustion.

Even when using conventional fixed bed gasifiers in which the waste is introduced in batches similar problems remain. These types of gasifiers have a very long processing time to gasify the waste, typically many hours, and the gas released contains a mixture of gases including large volumes of nitrogen, steam and carbon dioxide. The gas leaves the gasifier in a mixed gas stream and, the mixed gas composition is still of a low quality and is generally only suitable for combustion.

The end goal of waste to energy systems is to produce electrical energy. As described above this is typically done through converting the produced gas to heat to produce steam for driving a steam turbine. However the energy to power conversion efficiency using this method is quite low, typically in the region of 18% to 24%.

Higher efficiency conversion systems, e.g. direct combustion of syngas in a gas turbine or reciprocating engine are generally not used as the syngas produced from these conventional gasifiers is of a low quality that does not meet the fuel requirements of such engines or gas turbines which require a clean high calorific value syngas, typically in the order of 60-100 $BTU/FT^3$, containing no or very minimal tar content.

For low CV gas produced from conventional gasifiers to be used directly in a syngas engine or gas turbine then there are two options.

Firstly the low CV waste can be mixed with an externally sourced fuel, for example natural gas, propane, etc. This results in the introduction of vastly increased fossil fuel consumption in the gasifiers energy production, which is disadvantageous and harmful to the environment, and additionally increases the cost of energy production as it becomes reliant on an increased consumption of externally purchased fuel.

The second option is to post process the waste to increase the CV of the waste before it is gasified. This pre-processing is elaborate and is a prohibitively expensive procedure that combines multiple consecutive operations of shredding the waste, drying the waste and pelletizing the waste prior to gasification. Although this does provide a possibility for directly powering a gas engine, this process is a highly energy intensive process and, due to the high capital expenditure, operating expenditure, and maintenance expenditure required to transform the low CV waste into a refuse derived fuel (RDF), it is not a commercially attractive solution.

The present invention at least in part mitigates some of the above mentioned problems and provides a method and apparatus that allow the output from a gasification process of low CV waste to be converted to power in a syngas engine.

As used herein it will be appreciated that term "gas engine" includes various types of combustion engines that run on gas and includes, without limitation reciprocating gas engines and gas turbines.

According to a first aspect of the invention there is provided a method of processing material having an organic content comprising: heating a batch of said material in a batch processing apparatus having a reduced oxygen atmosphere to gasify at least some of the organic content to produce synthetic gas; elevating the temperature of said syngas and maintaining the syngas at said elevated temperature for a residence time sufficient to thermally break down any long chain hydrocarbons or volatile organic compounds therein; monitoring the calorific value of the syngas produced, when the calorific value of the syngas is below a predefined threshold, diverting the syngas, having a low calorific value, to a burner of a boiler to produce steam; and when the calorific value of the syngas exceeds said predefined threshold, diverting said syngas, having a high calorific value, to a gas engine to produce electricity.

The method may have a first predefined threshold and a second predefined threshold and, when the calorific value of the syngas is below said first predefined threshold, diverting the syngas, having a low calorific value, to a burner of a boiler to produce steam in a first mode of operation; when the calorific value of the syngas exceeds said first predefined threshold, diverting said syngas, having a high calorific value, to a gas engine to produce electricity in a second mode of operation; and when the calorific value of the syngas falls below a second threshold, diverting the syngas, having a low calorific value, to a burner of a boiler to produce steam in a third phase of operation.

As will be appreciated the present invention therefore provides a system which can switch between using the produced gas to power a boiler for conventional steam turbine derived power and can switch as soon as the CV is at an appropriate level to directly use the syngas in a syngas engine. As the syngas engine has a much higher energy conversion efficiency than the boiler/steam turbine, the overall system efficiency can be greatly improved while still using low CV waste without the need for pre-processing the waste or post-processing the gas.

The first and second thresholds have the same value or may differ. In either case the threshold value above which gas is directed to the syngas engine will have a CV suitable for use in the syngas engine.

The method may further comprise: when the calorific value of the syngas exceeds a third threshold, higher than said first and second predetermined thresholds, diverting said syngas, having a very high calorific value, to a storage vessel. As well as being consumed in a syngas engine syngas has other uses as a chemical fuel or for separation into its component gases for other chemical use. However the purity of the gasses used for this will need to be of an even higher CV than that used in the syngas engine.

The method can further comprise extracting heat from said syngas and using said heat to produce steam. Recovering the heat from this stage of the process not only reduces the temperature of the gas being fed to the syngas engine but also recovers energy from the gas which can be used to drive the boiler. To further increase overall efficiency, the waste heat from the gas engine can also be used to heat water in the boiler to produce steam.

The steam produced may be used to drive a steam turbine to produce electricity.

The method may comprise temporarily storing said syngas having a high calorific value and/or storing the syngas having a low calorific value in storage reservoirs, in this way not only can a buffer of fuel be provided as gas from a batch processing apparatus is not produced at a constant rate, but also the storage vessels act as mixing vessels as unlike constant process systems which tend to have a fairly consistent output gas composition, the gas composition from a batch processing system tends to vary over time. By using the storage vessels variations in composition over time are evened out and a gas having a more constant composition can be provided to the boiler/gas engine.

The method preferably further comprises cleaning said syngas prior to use. Known filtering and cleaning techniques can be used.

Monitoring the calorific value of the syngas produced may comprise monitoring the gas composition of the syngas, in particular it may comprise monitoring one or more of the hydrogen content of the syngas, the carbon monoxide content of the syngas, and the methane content of the syngas.

The calorific value of the syngas at the predetermined threshold may be in the range of 40 to 100 BTU per cubic foot. It may further be in the range of 80 to 100 BTU per cubic foot. The calorific value of the syngas at the third threshold may be in the range of 200-220 BTU per cubic foot.

Diverting the syngas, having a low calorific value, to a burner of a boiler to produce steam may comprise diverting the syngas through a first flow path leading to a thermal oxidiser, upstream of a boiler heat exchanger, wherein the syngas is combusted thereby creating a hot gas flow over the heat exchanger, and maintaining the syngas at said elevated temperature for said residence time; and diverting said syngas, having a high calorific value, to a gas engine may comprise diverting the syngas through a second flow path to a syngas engine, via a thermal treatment apparatus wherein the temperature of said syngas is elevated and maintained at said elevated temperature for said residence time.

The method may further comprise providing a recirculation loop having a burner therein and recirculating hot gases through the batch processing oven and said recirculation loop to heat said batch processing oven.

According to a second aspect of the invention there is provided an apparatus for processing material having an organic content comprising: at least one batch processing oven configured to heat a batch of said material in a reduced oxygen atmosphere to gasify at least some of the organic content of said material to produce syngas; at least one thermal treatment apparatus configured to receive syngas from said batch processing oven and having a heating means associated therewith, said thermal treatment apparatus configured to elevate the temperature of said syngas therein for a residence time sufficient to thermally break down any long chain hydrocarbons or volatile organic compounds present in the syngas; at least one sensing means for sensing the composition of the syngas produced and configured to output a signal indicative of its calorific value; at least one syngas engine; a boiler; valve means for directing syngas to the syngas engine or the boiler; and a controller configured to: detect when the calorific value of the syngas is below a predefined threshold and control said valve means to direct the syngas, having a low calorific value, to a burner of said boiler to produce steam; and detect when the calorific value of the syngas exceeds said predefined threshold and control said valve means to direct said syngas, having a high calorific value, to said gas engine to produce electricity.

As will be understood the apparatus can perform out the method of the first aspect of the invention.

The predetermined threshold may comprise a first predetermined threshold and a second predetermined threshold and the controller may be configured to: detect when the calorific value of the syngas is below said first predefined threshold and control said valve means to direct the syngas, having a low calorific value, to said burner of said boiler to produce steam in a first mode of operation; detect when the calorific value of the syngas exceeds said first predefined threshold and control said valve means to direct the syngas, having a high calorific value, to said gas engine to produce electricity in a second mode of operation; and detect when the calorific value of the syngas falls below said second threshold and control said valve means to direct the syngas, having a low calorific value, to said burner of said boiler to produce steam in a third phase of operation.

The controller may be further configured to detect when the calorific value of the syngas exceeds a third threshold higher than said first and second predetermined thresholds, and control said valve means to direct the syngas, having a very high calorific value, to a storage vessel.

A heat exchanger may be provided downstream of the thermal treatment apparatus and be configured to extract heat from said syngas to cool said syngas. The extracted heat can be used to produce steam.

A conduit may be provided to direct hot exhaust gasses from said gas engine to a heat exchanger in the boiler to produce steam.

The apparatus may have a turbine, driven by the steam, for producing electricity.

The apparatus can include a storage reservoir for temporarily storing the syngas having a high calorific value and/or a storage reservoir for temporarily storing the syngas having a low calorific value.

A cleaning unit for cleaning the syngas prior to use can also be provided.

The apparatus may comprise a gas analyser to monitor the gas composition of the syngas to obtain a signal indicative of its calorific value.

The gas engine may comprise one or more of a reciprocating engine and a gas turbine.

In one arrangement the thermal treatment apparatus may include valve means downstream of said batch treatment oven for diverting the syngas into one or more of a first flow path leading to said syngas engine and a second flow path leading to the boiler, and wherein the thermal treatment apparatus comprises a thermal reactor located in the first low path upstream of the syngas engine and a thermal oxidiser located in the second flow path upstream of the boiler.

The thermal reactor may be configured to heat the syngas without combusting it and wherein the thermal oxidiser is configured to heat the syngas to combust it.

The apparatus may further comprise a recirculation loop for recirculating hot gases through the batch processing oven without passing it through said thermal treatment apparatus, the apparatus further comprising a burner provided in a said recirculation loop for providing a flow of hot gas through said batch processing oven.

Specific embodiments of the invention will now be described, by way of example, in relation to the following diagrams in which.

Figure 1:
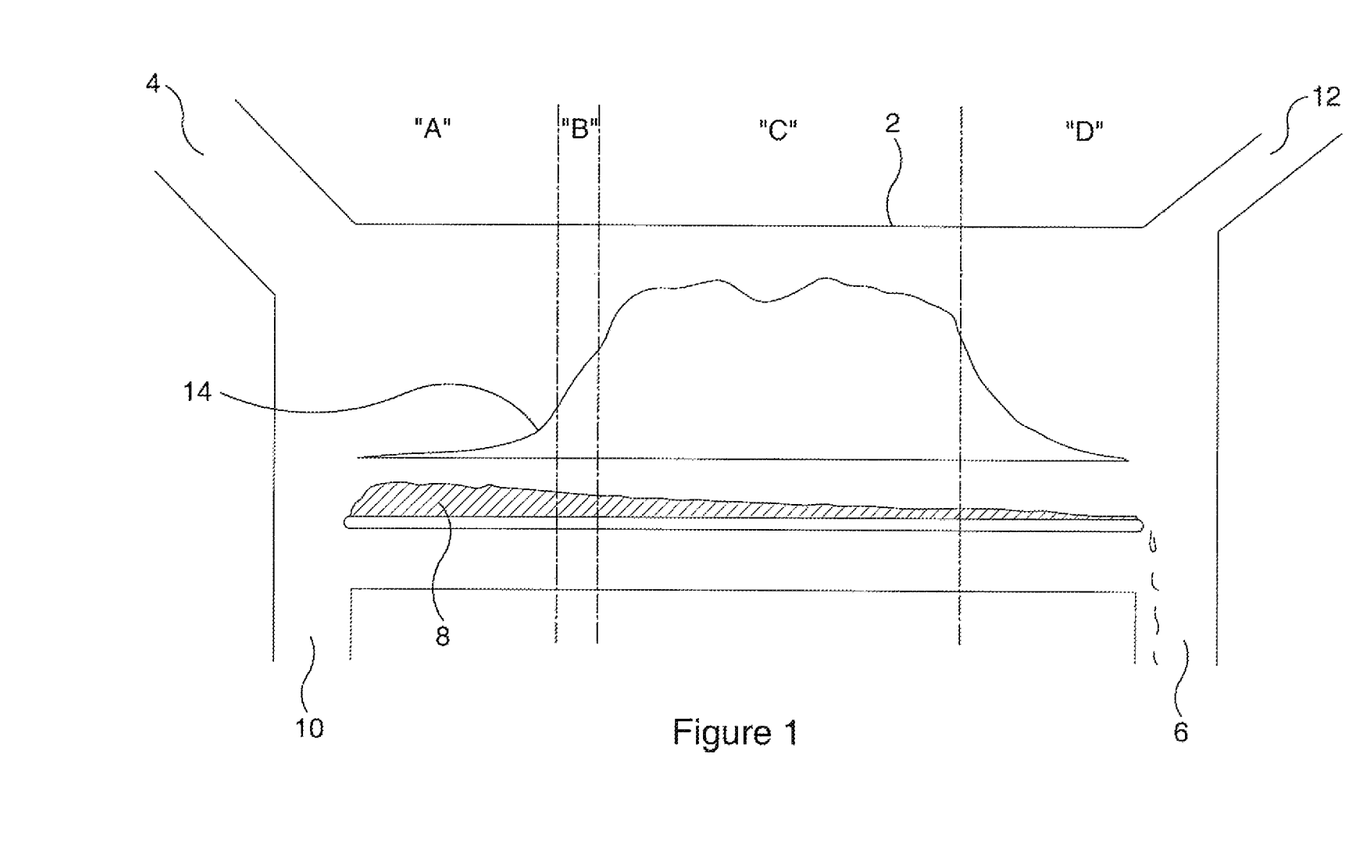
FIG. 1 is a schematic of a prior art constant process apparatus showing the gas quality of the emitted gas as the material passes therethrough.

Referring to FIG. 1 a schematic diagram of a continuous-feeding and processing treatment chamber 2 as is known in the prior art is shown. The chamber could be either a rotating kiln, where the waste 8 moves as it rotate inside by gravity, or fixed chamber, where the waste 8, moves by the action of moving grates (step-down grates). The chamber has a waste inlet 4 through which a constant supply of waste to be treated enters the chamber, and a residue outlet 6 through which residual waste (char, inert, metals, etc.) that is fully processed exits the chamber. Although not shown it will be appreciated that the inlet 4 and outlet 6 are configured in a known manner to minimise the amount of air that can enter with the waste or enter via chamber exit 6. The waste 8 is conveyed through the chamber and is gasified. A supply of oxygen deprived hot gas enters the chamber at gas inlet 10 and exits the chamber at gas outlet 12. During an initial phase of processing the waste 8 is heated by the hot gas and the moisture is evaporated. During this stage ("A") there is little gasification and as can be seen from the graph 14, which shows the CV of the syngas (synthetic gas) emitted from the waste at different points in space along the chamber. Once the moisture has been largely driven off the temperature of the waste starts to rise and gasification of the organic content thereof commences. During this stage ("B") there is an increase in the calorific value of the syngas produced. The calorific value of the syngas continues to rise as more carbon monoxide and hydrogen are released and plateaus in the region "C". Towards the exit 6 of the processing chamber 2 as the majority of the material has been processed the CV of the syngas released starts to drop ("D").

As in continuous waste-feeding and processing apparatus such as the one shown the hot gasses driving the process pass through the whole processing chamber the gasses emitted from waste 8 at different points along the chamber become entrained in a single outlet gas flow and become mixed. The result is that the syngas output, although of a relatively constant mass flow and calorific value, has a high moisture content and a low CV as the CV of the syngas will be the average of the CV of the gasses released along the length of the processing chamber. This combined syngas output does not have sufficient CV to be used directly in a syngas engine. This is specially the case for low CV waste that has high moisture content.

Figure 2:
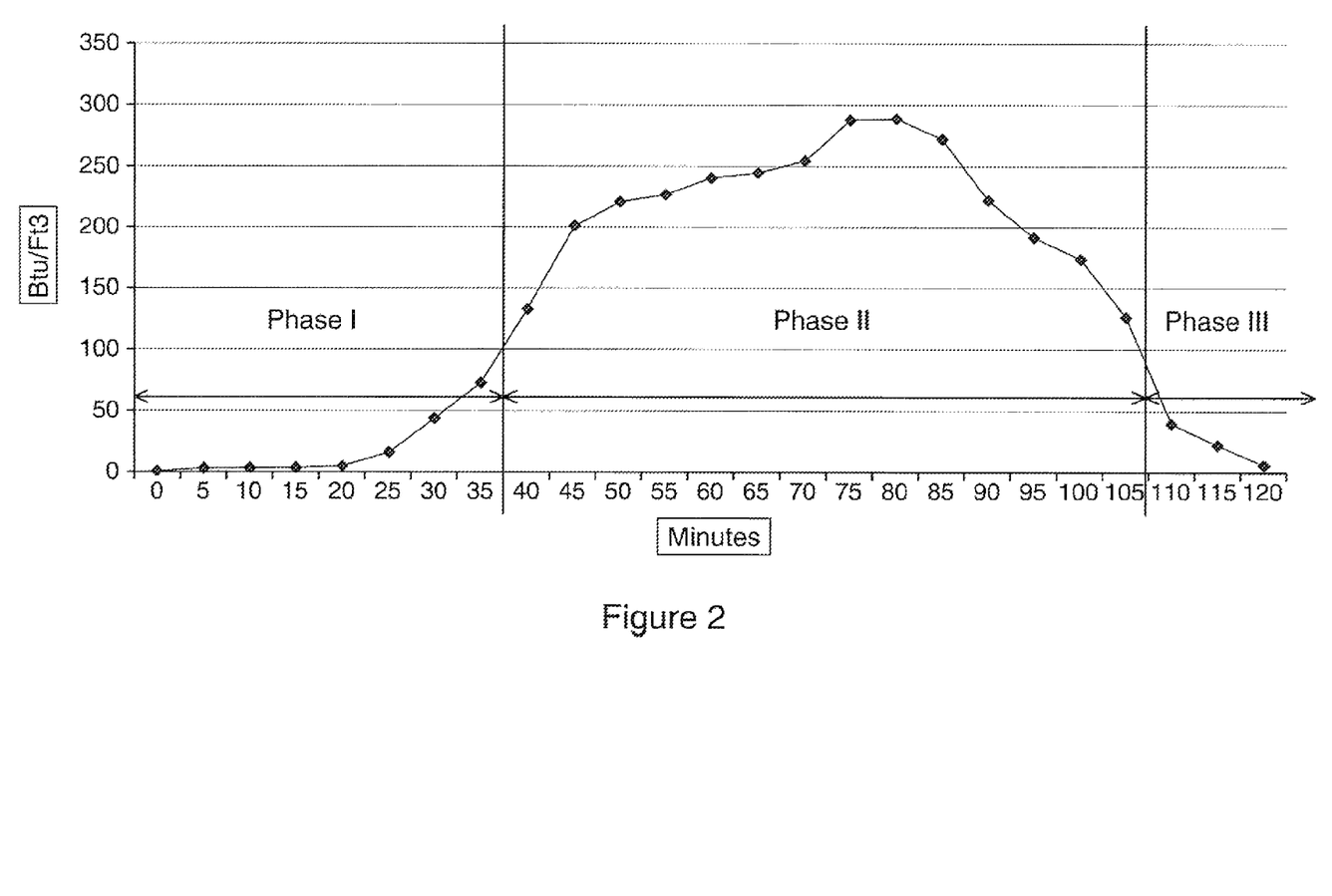
FIG. 2 is a graph of CV against time for a batch processing apparatus of the type that can be used with the invention.

Referring to FIG. 2 a graph of CV against time for a batch processing oven as used with the present invention is shown. The oven may be a rotating batch processing oven as described in international patent application WO 2006/100512. As can be seen CV of the syngas output from the batch processing oven changes over time in a similar manner as the output from the continuous process chamber changes over space. However, since the syngas generated in the batch processing chamber is continuously leaving the processing chamber, then the CV for the syngas exiting the chamber will be the actual CV of the syngas at any point of time (as in FIG. 2), and as it is not mixed with the syngas output from the process at different points in time. The CV of the exiting syngas is as shown in the graph for the specific time, and is not averaged across the cycle. As can be seen the syngas output is split into three distinct phases, a first phase in which the CV is low, a second stage in which the CV is high, and a third stage in which the CV is again low. The time shown in the figure here is by way of an example is 120 minutes, but it could be of lower or higher processing time.

Figure 3:
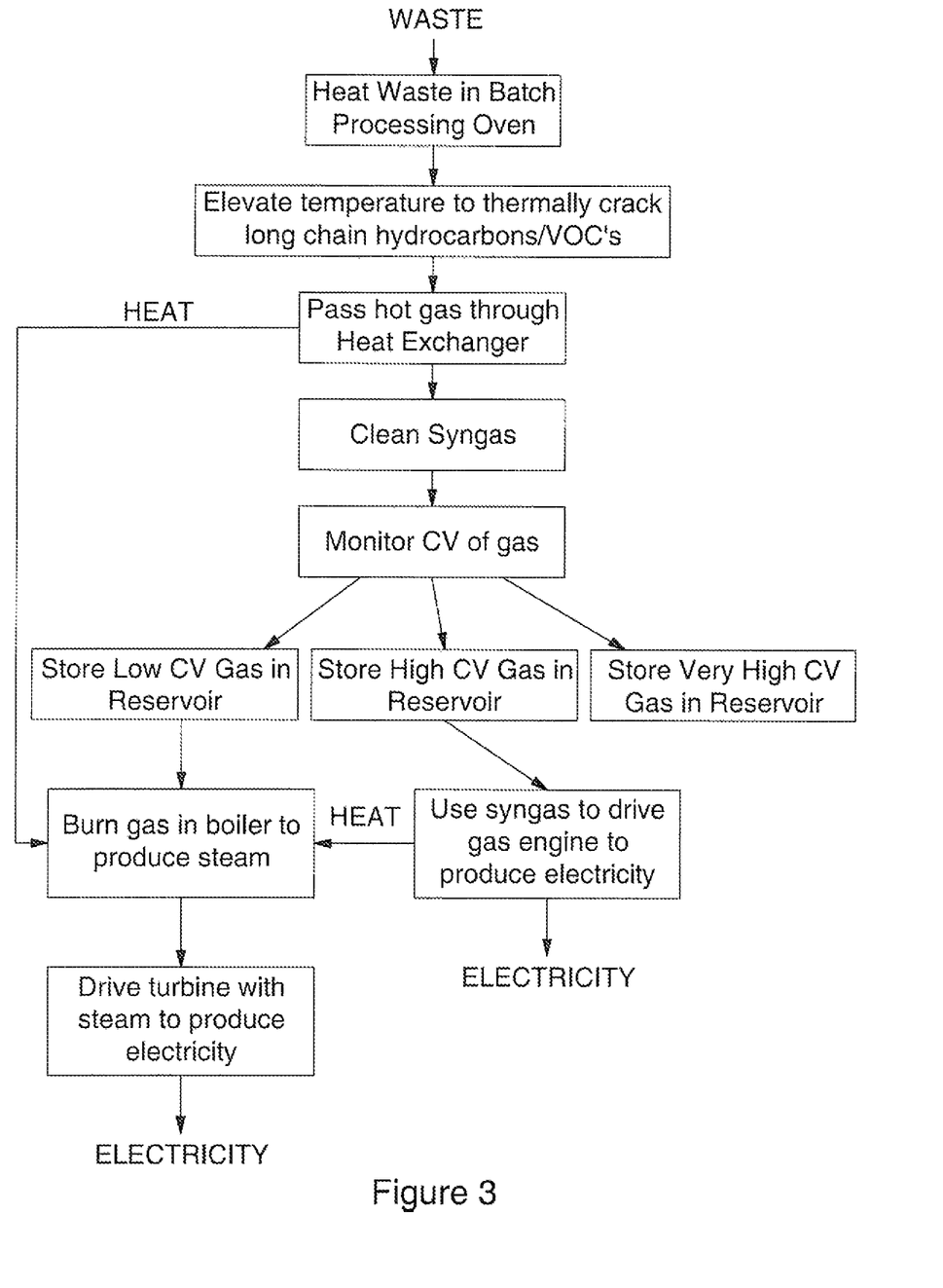
FIG. 3 is a flow diagram of the method of the present invention.
Figure 4:
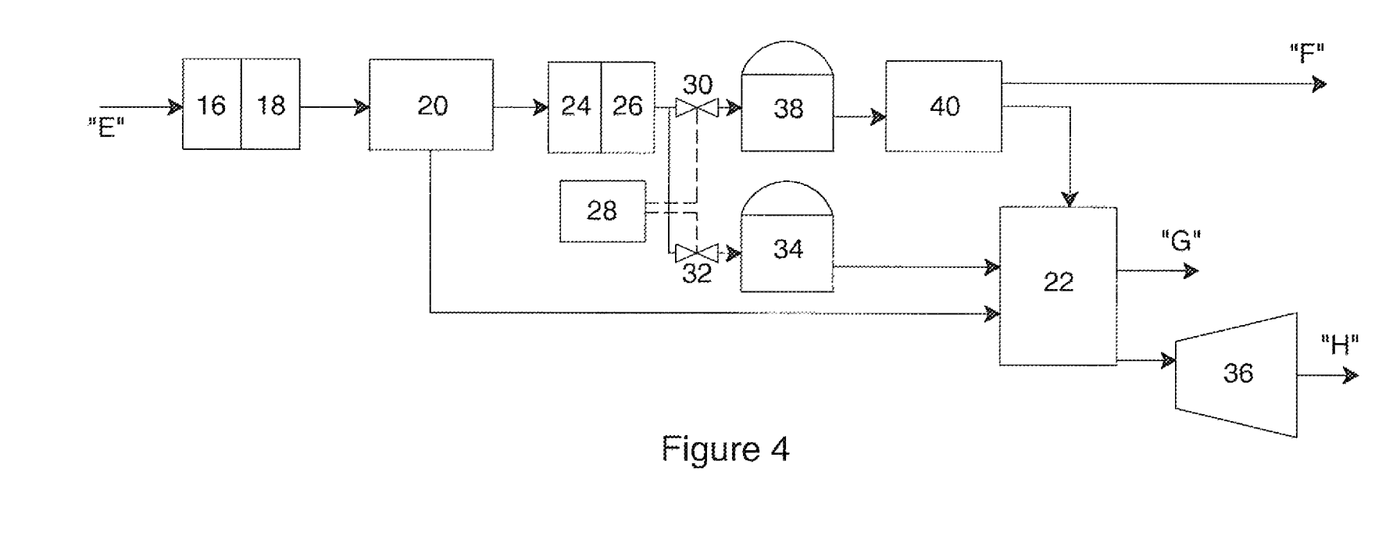
FIG. 4 is a diagram of an apparatus of the present invention.

Referring to FIGS. 3 and 4 a schematic diagram of the method of the invention is shown.

A batch of waste "E" having an organic content is placed in a batch processing gasification apparatus 16 which may, for example be similar to the rotating oven disclosed in WO 2006/100512. The oven is closed and gas having a low oxygen content circulated through it to heat the material therein to a temperature effective for gasification. The gasification temperature may vary depending on process parameters but will typically be in excess of 500° C. and oxygen content will be below 3%, preferably below 1% volumetric flow rate.

As the process starts some gasification will occur but the majority of the heat will be utilised in evaporating the moisture content from the waste. The syngas produced at this point has a low calorific value (Phase 1, FIG. 2).

After exiting the processing chamber the gas enters a thermal treatment apparatus 18 where it is elevated to a temperature in the region of 1100° C. The gas is maintained in the thermal treatment apparatus at this temperature for a residence time sufficient for the long chain hydrocarbons and VOC's in the gas to be broken down into short chain hydrocarbons (e.g. $CH_4$), carbon monoxide and hydrogen. Contrary to WO the system disclosed in 2006/100512 the syngas is not burned in the thermal treatment apparatus. The apparatus does include a burner but is only provided with a stoichiometric ratio of fuel to oxygen such that there is no surplus of oxygen to permit the syngas entering the treatment apparatus from the oven to be combusted.

After exiting the thermal treatment chamber 18 the gasses are passed through a heat exchanger 20 to cool them. This serves two purposes, firstly it recovers heat from the syngas which can be fed into the boiler and secondly it cools the syngas so that the downstream parts of the system can have a lower temperature rating which simplifies and reduces the cost of the system. The heat exchanger 20 may have a circulating fluid which exchanges heat with the boiler 22 to heat the water therein to produce steam, or alternatively the heat exchanger 20 may directly create steam, effectively acting as a secondary boiler.

The cooled syngas is then passed through a cleaning unit 24 to remove any particulate matter or other pollutants entrained therein. This is done using known techniques which will be apparent to the person skilled in the art.

The cleaned syngas is monitored to determine its CV, or an indication of its CV. As will be appreciated, monitoring may be done upstream of the cleaning unit 24 but is preferably done downstream so that any pollutants in the syngas do not interfere or degrade sensors overtime. The CV is preferably monitored by measuring one or more of the CO content, the $H_2$ content and the $CH_4$ content of the syngas, for example with an on-line gas analyser 26, and producing a signal indicative of the CV therefrom.

A controller 28 receives the signals indicative of the CV of the gas being produced and controls valves 30, 32. In the initial phase of operation when the CV level is low and the moisture content is high the controller closes valve 30 and opens valve 32 to direct the gas into a low CV gas reservoir 34. Gas from this reservoir is fed via a valve arrangement (omitted for clarity) to the burner of a boiler 22 where it is burned. Water within the boiler is heated by the burning syngas, and by the heat extracted from the heated exchange 20 and produces steam which is used to drive a steam turbine 36 to produce electricity "H".

As the material in the chamber continues to be processed the moisture will become evaporated and more of the material will start to gasify. The CV of the syngas released will start to increase. The controller 28 which is receiving the signal indicative of the CV monitors the signal and once a predefined threshold is reached which is in the region of 40 to 120 BTU per cubic foot (preferably 80-100 BTU per cubic foot) the controller 28 operates the valves to close valve 32 and open valve 30 so that the syngas having a CV above the threshold is directed into a High CV gas reservoir 38. Gas from the reservoir 38 is fed, via a valve system (omitted for clarity) to the gas engine 40. The gas engine 40 may be a single gas engine or may be multiple gas engines of different types, for example gas turbine and a reciprocating gas engine may be provided. The syngas fuels the gas engine 40 to produce electricity "F". As the energy to power conversion efficiency for the syngas engines in typically in excess of 33%, often around 38%, and as the energy to power conversion efficiency for the steam boiler/turbine is typically 18-24 percent, by switching as soon as the required quality of gas, i.e. the sufficient CV is achieved, the overall efficiency of the process is greatly improved.

The syngas engine(s) 40 will produce hot exhaust gas as a by-product of the energy conversion therein and this is fed into a heat exchanger in the boiler 22 to recover heat therefrom and assist in the generation of steam.

The flue gas "G" from the boiler may be treated in any known manner prior to being released to atmosphere, if necessary.

As the batch of material approaches the end of its processing cycle the amount of carbon monoxide, hydrogen and other high hydrocarbons in the syngas being released therefrom will start to fall and the CV of the syngas exiting the processing chamber will start to drop. Once the controller 28 detects that the CV has dropped below a predefined threshold, which will be the same or very similar to the threshold used in the ramp up of CV, the controller again activates the valves 30, 32 to again direct the syngas having the lower CV that is no longer of sufficient quality for use in the syngas engine 40 to the low CV gas reservoir 34.

As will be understood from the diagrams, due to the heat extracted from cooling the syngas and the heat extracted from the syngas engine exhausts, even when the syngas is not being directed to the low CV reservoir 34, steam will continue to be produced and drive the steam turbine 36.

As will also be appreciated, during the low CV gas production in phases 1 and 3 (FIG. 2) and during the high CV gas production in phase 2, the CV and moisture content of the produced syngas is not constant. The reservoirs 34, 38 provide buffer vessels in which the gasses being produced can mix with one another so that the gas drawn therefrom is of a more consistent CV than the syngas entering the reservoirs 34, 38. Furthermore, the reservoirs will preferably be sized so that they can provide a sufficient buffer of syngas of each quality so that the gas engine and the boiler can be run continuously, irrespective of which reservoir the syngas is being directed to at a given instance in time.

Figure 5:
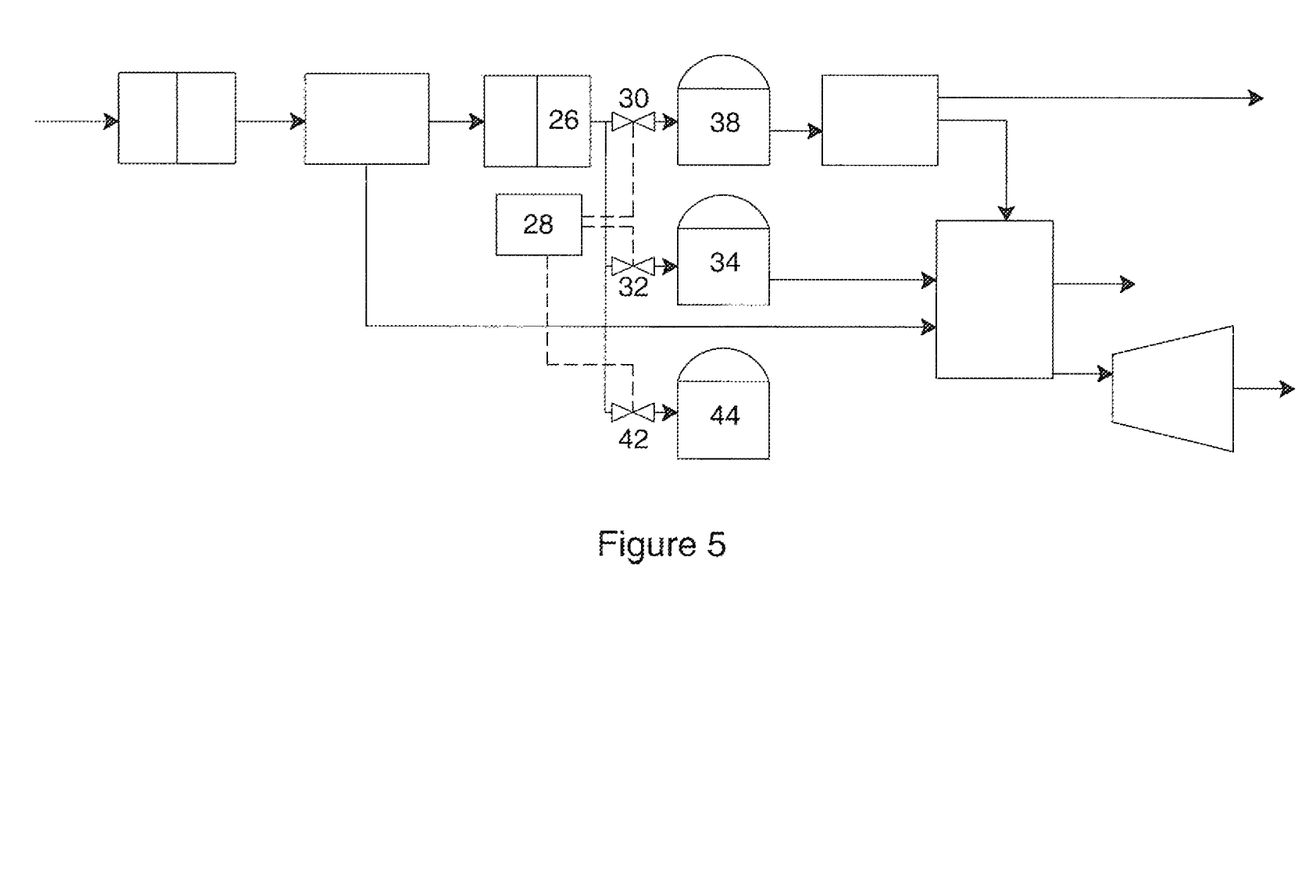
FIG. 5 is a diagram of a further apparatus of the present invention.

Referring to FIG. 5, in addition to the above an additional feature of the invention is the ability for the controller 28 to monitor the CV of the syngas being produced and if it exceeds a third, higher, threshold, for example the BTU exceeds a threshold in the region of 200-220 BTU per cubic foot, the controller controls shuts both valves 30 and 32 and opens valve 42 to direct the syngas having the highest CV to a storage vessel 44. This syngas can then be used in other processes and is not used directly in the production of electricity via the boiler or syngas engine.

Figure 6:
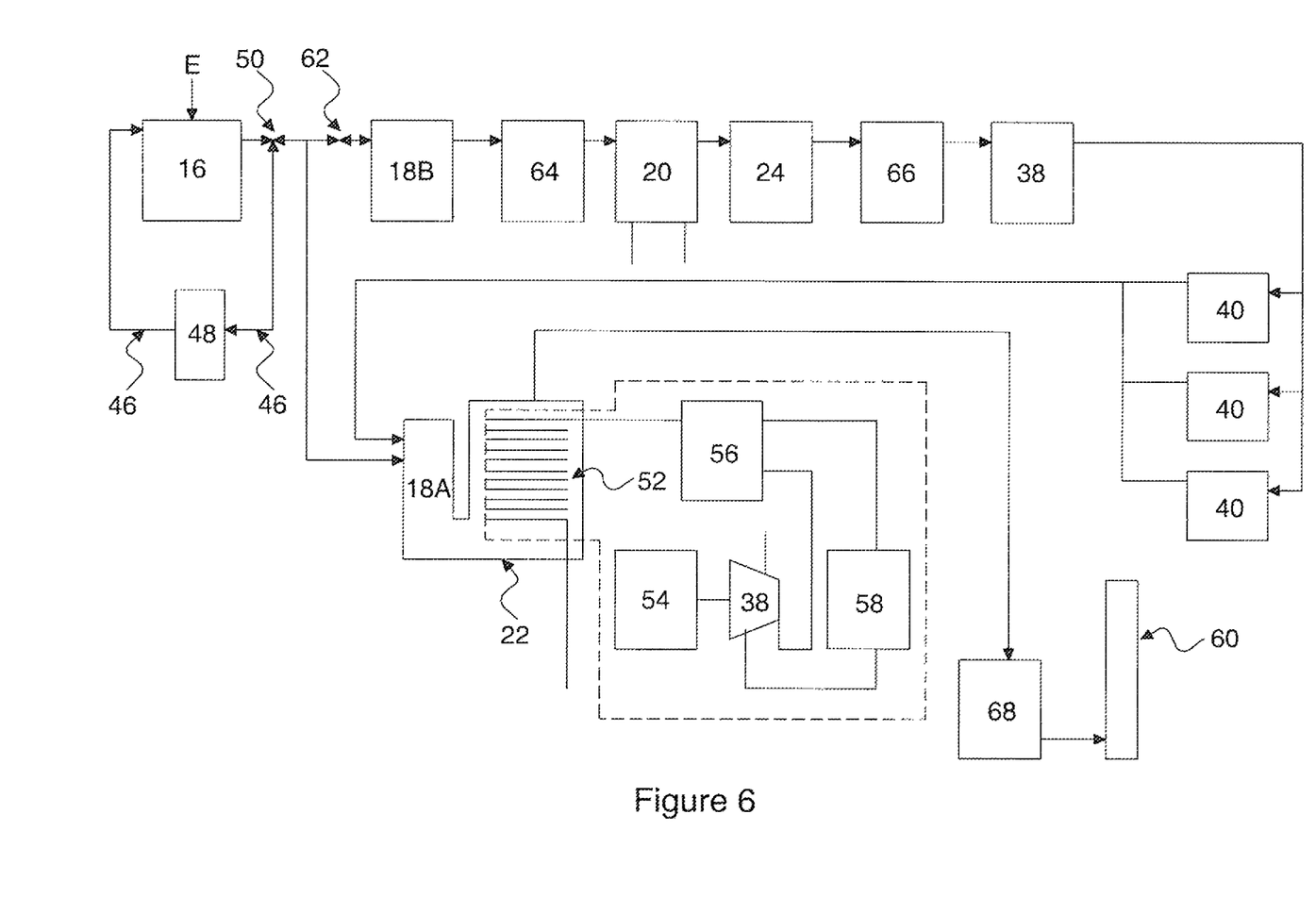
FIG. 6 is a diagram of a further apparatus of the invention.

Referring to FIG. 6 a further apparatus of the invention is shown. In this apparatus the batch processing apparatus 16 has a conduit 46 forming a recirculation loop through a burner 48 which may be an oxygen burner. A calve 50 can selectively diver the gas flow from the processing apparatus 16 through the recirculation loop. In start up this can assist in quickly increasing the temperature in the apparatus 16. By maintaining a small recirculation loop the heat losses care minimised and fast heat up can be achieved.

Downstream of the valve 50 the flow path of the gasses exiting the processing apparatus 16 splits. One flow path leads to a thermal oxidiser 18A and the other leads to a thermal cracking unit 188, the thermal oxidiser and the thermal cracking unit together forming a thermal treatment apparatus. Considering first the flow path through the thermal oxidiser 18A, this is the first flow path through which the gasses exiting the processing apparatus 18 will pass.

In the thermal oxidiser 18A, a burner combusts the gasses entering the oxidiser in the presence of oxygen (e.g. air), so as to produce a flow of hot combustion gasses. These gasses pass over a heat exchanger 52 that produces steam to drive a steam turbine 36 attached to a generator 54 that produces electricity. The thermal oxidiser 18A and the heat exchanger 52 together form the boiler 22. A dearator 56 and a condenser 58 are provided in the condenser loop to condense the steam after it has passed through the steam turbine. After passing over the heat exchanger 52 the combustion gasses, which have then been cooled, pass through purifiers, which may include any suitable air cleaning technology known in the art, for example baghouse filters 68 prior to being vented to atmosphere through a flue stack 60.

As the batch of material being processed enters the phase II (FIG. 2) the calorific value of the gas is increased. As the calorific value of the gas increases the capacity of the thermal oxidiser 18A will be reached and will be in danger of overheating. To avoid this the valve 62 can be opened allowing at least some of the gas to pass into the cracking unit 188 wherein it is heated, in the absence of oxygen, and retained at an elevated temperature for sufficient time so as to destroy any VOC's and long chain hydrocarbons therein. The gasses then pass out of the thermal cracking unit 188 and pass through a quencher 64 and a heat exchanger 20 to reduce the temperature of the gasses. The heat exchanger 20 may be connected to the heat exchanger of the boiler 22 and the turbine 38 to increase the temperature of the steam driving the turbine. After the heat exchanger 20 the cooled syngas passes through a cleaning unit 24, for example a venturi scrubber system, and a wet scrubber system 66. The gas is then ready to pass into the gas storage 38. A plurality of syngas engines 40 are provided downstream of the gas reservoir in which the syngas from the reservoir 36 is transformed into electrical energy by using the syngas engines to drive a generator.

Using this method the boiler can be run constantly through the cycle and during the peak cycle (phase II) where the capacity of the thermal oxidiser/boiler is not sufficient to handle the energy of all of the gas being produced (due to its increased volume and/or CV), at least some of the gas can be diverted through the thermal cracking unit, cleaned and buffered in the reservoir 36. This can then be used to drive the syngas engines 40. The buffer created by the storage vessel 38 allows for a relatively constant operation of the syngas engines irrespective of the cyclic gas production. Furthermore by constantly utilising the thermal oxidiser and boiler the steam turbine can be run at relatively constant conditions. When the production of gas by the treatment apparatus 16 slows, and lowers in CV the valve 52 can be operated to reduce and/or stop the gas flow to the thermal cracking apparatus 18B. However, due to the buffer of gas in the storage vessel the syngas engine can still be run.

It is a specific advantage of this embodiment that the thermal treatment apparatus is separated into a thermal oxidiser and a thermal cracker which split the maximum load between them. Therefore, when not running at maximum capacity, which is for a large portion of the cycle, only the thermal oxidiser is used. As such the thermal oxidiser is designed to meet a reduced capacity, and is therefore smaller, and as such operates more efficiently due to increased utilisation. The size of the thermal oxidiser is therefore designed for the efficiency of the majority of the cycle, rather than to the maximum gas production.

The invention claimed is:

1. A method of processing material having an organic content comprising:
   heating a batch of said material in a batch processing apparatus having a reduced oxygen atmosphere to gasify at least some of the organic content to produce syngas gas;
   elevating the temperature of said syngas and maintaining the syngas at said elevated temperature for a residence time sufficient to thermally break down any long chain hydrocarbons or volatile organic compounds therein;
   monitoring the calorific value of the syngas produced,
   when the calorific value of the syngas is below a predefined threshold, diverting the syngas, having a low calorific value, to a burner of a boiler to produce steam; and
   when the calorific value of the syngas exceeds said predefined threshold, diverting said syngas, having a high calorific value, to a gas engine to produce electricity.

2. A method according to claim further comprising a first predefined threshold and a second predefined threshold and wherein:
   when the calorific value of the syngas is below said first predefined threshold, diverting the syngas, having a low calorific value, to a burner of a boiler to produce steam in a first mode of operation;
   when the calorific value of the syngas exceeds said first predefined threshold, diverting said syngas, having a high calorific value, to a gas engine to produce electricity in a second mode of operation; and
   when the calorific value of the syngas falls below a second threshold, diverting the syngas, having a low calorific value, to a burner of a boiler to produce steam in a third mode of operation.

3. The method according to claim 2 wherein the first and second thresholds have the same value.

4. The method according to claim 2 further comprising:
   when the calorific value of the syngas exceeds a third threshold, higher than said first and second predefined thresholds, diverting said syngas, having a very high calorific value, to a storage vessel.

5. The method according to claim 1 wherein monitoring the calorific value of the syngas produced comprises monitoring the gas composition of the syngas.

6. The method according to claim 5 wherein monitoring the gas composition of the syngas comprises monitoring one or more of the hydrogen content of the syngas, the carbon monoxide content of the syngas, and the methane content of the syngas.

7. The method according to claim 1 wherein the calorific value of the syngas at the predefined threshold is in the range of 40 to 100 BTU per cubic foot.

8. The method according to claim 7 wherein the calorific value of the syngas at the predefined threshold is in the range of 80 to 100 BTU per cubic foot.

9. The method according to claim 8 wherein the calorific value of the syngas at the third threshold is in the range of 200 to 220 BTU per cubic foot.

10. The method according to claim 1 further comprising extracting heat from said syngas and using said heat to produce steam.

11. The method according to claim 1 further comprising using waste heat from said gas engine to heat water in said boiler to produce steam.

12. The method according to claim 1 further comprising using said steam to drive a steam turbine to produce electricity.

13. The method according to claim 1 further comprising temporarily storing said syngas having a high calorific value in a storage reservoir.

14. The method according to claim 1 further comprising temporarily storing said syngas having a low calorific value in a storage reservoir.

15. The method according to claim 1 further comprising cleaning said syngas prior to use.

16. The method according to claim 1 wherein:
diverting the syngas, having a low calorific value, to a burner of a boiler to produce steam comprises diverting the syngas through a first flow path leading to a thermal oxidiser, upstream of a boiler heat exchanger, wherein the syngas is combusted thereby creating a hot gas flow over the heat exchanger, and maintaining the syngas at said elevated temperature for said residence time; and
wherein diverting said syngas, having a high calorific value, to a gas engine comprises diverting the syngas through a second flow path to a syngas engine, via a thermal treatment apparatus wherein the temperature of said syngas is elevated and maintained at said elevated temperature for said residence time.

17. The method according to claim 1 further comprising providing a recirculation loop having a burner therein and recirculating hot gases through the batch processing oven and said recirculation loop to heat said batch processing oven.

18. An apparatus for processing material having an organic content comprising:
at least one batch processing oven configured to heat a batch of said material in a reduced oxygen atmosphere to gasify at least some of the organic content of said material to produce syngas;
at least one thermal treatment apparatus configured to receive syngas from said batch processing oven and having a heating means associated therewith, said thermal treatment apparatus configured to elevate the temperature of said syngas therein for a residence time sufficient to thermally break down any long chain hydrocarbons or volatile organic compounds present in the syngas;
at least one sensing means for sensing the composition of the syngas produced and configured to output a signal indicative of its calorific value;
at least one gas engine;
a boiler;
valve means for directing syngas to the gas engine or the boiler; and
a controller configured to:
detect when the calorific value of the syngas is below a predefined threshold and control said valve means to direct the syngas, having a low calorific value, to said boiler; and
detect when the calorific value of the syngas exceeds said predefined threshold and control said valve means to direct said syngas, having a high calorific value, to said gas engine.

19. The apparatus according to claim 18 wherein the thermal treatment apparatus includes valve means downstream of said batch treatment oven for diverting the syngas into one or more of a first flow path leading to said syngas engine and a second flow path leading to the boiler, and wherein the thermal treatment apparatus comprises a thermal reactor located in the first flow path upstream of the syngas engine and a thermal oxidiser located in the second flow path upstream of the boiler.

20. The apparatus according to claim 19 wherein said thermal reactor is configured to heat the syngas without combusting it and wherein the thermal oxidiser is configured to heat the syngas to combust it.

21. The apparatus according to claim 19 further comprising a recirculation loop for recirculating hot gases through the batch processing oven without passing it through said thermal treatment apparatus, the apparatus further comprising a burner provided in a said recirculation loop for providing a flow of hot gas through said batch processing oven.

22. An apparatus according to claim 18 wherein said predefined threshold comprises a first predefined threshold and a second predefined threshold and wherein the controller is configured to:
detect when the calorific value of the syngas is below said first predefined threshold and control said valve means to direct the syngas, having a low calorific value, to said burner of said boiler to produce steam in a first mode of operation;
detect when the calorific value of the syngas exceeds said first predefined threshold and control said valve means to direct the syngas, having a high calorific value, to said gas engine to produce electricity in a second mode of operation; and
detect when the calorific value of the syngas falls below said second predefined threshold and control said valve means to direct the syngas, having a low calorific value, to said burner of said boiler to produce steam in a third phase mode of operation.

23. The apparatus according to claim 18 wherein the controller is further configured to detect when the calorific value of the syngas exceeds a third threshold, higher than said first and second predefined thresholds, and control said valve means to direct the syngas, having a very high calorific value, to a storage vessel.

24. The apparatus according to claim 18 further comprising a heat exchanger downstream of the thermal treatment apparatus configured to extract heat from said syngas to cool said syngas and to produce steam.

25. The apparatus according to claim 18 further comprising a conduit to direct hot exhaust gasses from said gas engine to a heat exchanger in said boiler to produce steam.

26. The apparatus according to claim 18 further comprising a turbine, driven by said steam, for producing electricity.

27. The apparatus according to claim 18 further comprising a storage reservoir for temporarily storing said syngas having a high calorific value.

28. The apparatus according to claim 18 further comprising a storage reservoir for temporarily storing said syngas having a low calorific value.

29. The apparatus according to claim 18 further comprising a cleaning unit for cleaning said syngas prior to use.

30. The apparatus according to claim 18 further comprising a gas analyser to monitor the gas composition of the syngas to obtain a signal indicative of its calorific value.

31. The apparatus according to claim 18 wherein the gas engine comprises one or more of a reciprocating engine and a gas turbine.

* * * * *